United States Patent Office 3,163,219
Patented Dec. 29, 1964

3,163,219
BORATE-GUM GEL BREAKERS
Reece E. Wyant, Thomas K. Perkins, and Thomas F. Moore, Dallas, Tex., assignors to The Atlantic Refining Company, Philadelphia, Pa., a corporation of Pennsylvania
No Drawing. Filed June 22, 1961, Ser. No. 118,778
13 Claims. (Cl. 166—42)

This invention relates to an improved, self-breaking, borate-gum, water-base gel utilized in oil, gas and water wells. More specifically, this invention concerns delayed action gel breakers for borate-gum gels.

While the following description will be directed particularly to the breaking of fracturing gels utilizing the borate-gum reaction to produce a gel, the properties of the gel breakers described herein are suitable for other types of well treatments requiring the breaking of borate-gum gels.

With the widespread use of hydraulic fracturing for stimulating the production of fluids from well formations, the use of a water-base fracturing fluid has become highly desirable. Since large quantities of fluids are required in fracturing wells, especially areas exhibiting thick, massive formations, significant savings can be realized by utilizing a water-base fluid instead of the more expensive oil base or emulsion type fluids. Borate ions and certain natural gums having cis di-diol groups or adjacent cis hydroxyl units form a gel in water which provides a highly satisfactory fracturing fluid. In a fracturing operation, this gel is pumped into an oil, gas or water well and is viscous enough to permit the build up of fracturing pressure in the well bore without being too viscous to be pumped down the well tubing or casing. The gel also acts as a carrier for formation propping particles. For a satisfactory fracturing operation, the gel must retain its high viscosity and particle suspending qualities from approximately 1 to 24 hours; however, after the formation is fractured, the gel must be evacuated so that the producing formation is free to flow its fluids. This requires that the gummy residue deposited by the fracturing fluid gel be broken up so that the producing liquids can clean the formation and remove the gel chemicals. To break up the gel into a thin fluid, suitable gel breakers are required.

In addition to destroying the gel, the action of the gel breakers must be delayed for the desired time length. The gel breakers must also be economical, easy to prepare in the field, and not adversely affect the carrying properties of the fluid during fracturing operations.

It is, therefore, an object of this invention to provide gel breakers for borate-gum, water-base gels.

Another object of this invention is to provide delayed action gel breakers for borate-gum, water-base gels that cause the gel fluid to revert back to a thin fluid and finely divided gum residue.

An additional object of this invention is to provide suitable delayed action, borate-gum gel breakers that enable the formation fluids to flow the broken gel from the formation after the desired time has elapsed.

Still another object of this invention is to provide delayed action borate-gum gel breakers that do not adversely affect the carrying properties of the fluid gel.

Briefly, the foregoing and other objects are accomplished by three classes of gel breakers and mixtures thereof all of which are economical and suitable for field use. These are solid calcium sulfate, sulfur and mixtures thereof. These elements or compounds have proved to be effective, controllable, gel breakers for water-base gels formed by the reaction between a gum having cis di-diol groups or adjacent, reactive cis hydroxyl units and borate ion producing compounds. Herein, these gels are called borate-gum gels.

The borate-gum, water-base gels referred to herein are prepared by reacting an organic compound having at least one reactive unit consisting of two adjacent hydroxyl groups arranged in a "cis" configuration, or, that is, cis di-diol units reacting as one unit, with a boron compound capable of supplying borate ions in an aqueous solution. Preferably, the organic material is one having repetitive organic groupings forming a high molecular weight polyhydroxyl carbohydrate with the above-specified hydroxyl or diol units. Some particular organic compounds falling within this class are guar gum and locust bean gum. The boron compounds suitable for preparing the gel are borate ion producing compounds like boric acid, sodium biborate, potassium tetraborate, and borax. The borate-gum gels are suitable for use as fracturing fluids, drilling fluids, workover fluids and related fluids utilized in crude oil and gas production operations. The aqueous phase of the gel may contain other chemicals and salts and the gel combined with solids like fluid-loss control agents, lost circulation material, weighting materials and fracture propping materials.

The above-mentioned gel breakers can be used with a coating or binding agent to increase the delay time and control the rate of gel breaking. The binding agent is preferably a water-insoluble, oil-soluble material that is insoluble in the water-base fluid but is dissolved by the formation liquids. More specifically, such water-insoluble agents as rosin, asphalts, natural waxes, synthetic waxes, paraffin, microcrystalline waxes, and polyethylene waxes can be used. When the bottomhole temperature conditions are known, a water-insoluble, temperature-sensitive binding agent which is composed of a material that melts at the temperature under which the gel is to break, for example, controlled melting point paraffins may be used. The binding agent can also be a water-soluble material which is slowly soluble in the water-base gel. For example, methyl-cellulose and gelatin provide excellent slowly water-soluble materials. All of the above-mentioned binding materials are suitable for use as a binder for the sulfur, calcium sulfate, or mixtures of sulfur and calcium sulfate gel breakers. The time delay caused by the binding material is influenced by the time required for the gel to contact the gel breaker. It is obvious, therefore, that the way the binder is mixed with the gel breaker and the amount and type of binder used determines to a great extent the delay of the breaking of the gel by the gel breaker. Of course, there are other factors, as hereinafter described, which also control the rate at which the gel breaks. The following are examples of methods for mixing the gel breaker with the binding or coating agent. The gel breaker may be granulated or crushed to the desired size and mixed with a flaked or crushed binder. The mixture is then extruded under the desired pressure and at an elevated temperature. Another system is to melt the binder and stir the gel breaker into the melted binding agent thereafter allowing the mixture to solidify either as small particles or as a large mass. The solidified mixture is then sized to the desired size. When sulfur is used as the gel breaker, the gel breaking agent could be melted along with the binding agent and the two liquids mixed. Upon solidification, the resulting solid mixture is granulated or crushed to the desired size. Another method is to mix the gel breaker with the binding agent and pelletize the mixture under high compression. The pelletized method has particular advantages since the breaking speed is more readily controlled and the pelletized form is conveniently handled for transporting and mixing at the well site.

The minimum binder required is the minimum amount necessary to combine the active ingredients in the form desired and the maximum binder required is not more than 90 percent binder and 10 percent gel breaker agent by weight.

Preferably, the above-mentioned gel breakers will usually be used without the binding agent since the breaking time can be readily controlled without the binding agent.

Factors governing the time that the gel breaker takes to break the gel are particle size, concentration of the gel breaker, type of gel breaker, and concentration of the gum-borate gel forming compounds. The temperature and pressure of the well are also contributing factors.

Since the amount of gel breaker to be used is dependent upon the length of time that the gel is to remain effective, upon the particle size of the gel breaker, upon the active ingredients involved in forming the gel and upon the environmental conditions under which the breaker must work, it is impractical to set upper and lower limits upon the amounts of gel breaker to be utilized. Moreover, when a binder is used, the concentrations of gel breaking agents are different from the concentrations utilized without the binder.

A typical fracturing fluid having a delayed breaking time can be formed by first mixing the borate and gum chemicals in an aqueous solution to form a water-gel of the desired consistency. A fracture propping agent, like sand, can be added. Thereafter, a predetermined amount of sized gel breaker will be suspended in the gel. In utilizing the gel, the resulting mixture is injected into the well bore and pressurized into the desired formation thereby creating or extending fractures in the formation. After fracturing the formation, the formation fluids are either produced immediately or the well bore is shut-in and the formation allowed to remain quiescent until the gel has broken before the formation fluids are produced. When a binding agent is used, the method of producing the well will depend on the type of binding agent used. If a temperature-sensitive or water-soluble binding agent is used, the formation can be allowed to remain quiescent until the gel breaks. If an oil-soluble binding agent is used, the formation fluids are produced until the binder is dissolved. Thereafter, either the well is shut-in until the gel breaks or the production is continued and the gel gradually breaks and gel chemicals are removed.

The following examples illustrating the ability of the gel breakers to break water-base, borate-gum gels are sufficient to define the concentrations required and to enable one skilled in the art to utilize the gel breakers disclosed herein. In the following examples, the preferred concentrations of gel breakers for a borate-guar gum, water-base, fracturing fluid gel are presented.

*Example I*

A preferred use of the sulfur gel breaking agent utilized in breaking a borate-guar gum, water-base, fracturing fluid gel is as follows:

| | |
|---|---|
| Lb. of guar gum | 1.31 |
| Lb. sodium carbonate | 0.7 |
| Lb. boric acid | 0.14 |
| Lb. flours of sulfur | 1.7 |
| Bbl. of water (42 gal.) | 1.0 |

If the solution is maintained at a temperature of 155° F., the breaking action will take place throughout a period of five hours and after approximately seven hours the gel is completely broken.

*Example II*

A preferred use of calcium sulfate as a gel breaking agent for a borate-guar gum, water-base, fracturing fluid gel is as follows:

| | |
|---|---|
| Lb. of guar gum | 1.31 |
| Lb. sodium carbonate | 0.07 |
| Lb. boric acid | 0.14 |
| Lb. hydrated calicum sulfate | 1.4 |
| Bbl. water (42 gal.) | 1.0 |

The calcium sulfate is crushed to approximately 20 mesh size and at a temperature of 160° F. will begin to break the gel in four hours completely breaking it within twenty-four hours.

It will be apparent to those skilled in the art that various modifications and uses of the above-mentioned gel breakers may be made in preparing a delayed action borate-gum gel for use in fracturing or drilling operations without departing from the present invention, which is limited only in accordance with the appended claims.

We claim:

1. A self-breaking gel designed to break after a time delay comprising a mixture of a water-base, borate-gum gel and a gel breaker selected from the group consisting of sulfur, calcium sulfate and mixtures thereof in the amount and granular size necessary to break the gel after said time delay, said gel breaker being coated with a binding agent selected from the class of water-insoluble, hydrocarbon-soluble materials, said materials being suitable for use as a binding agent for said gel breaker.

2. A self-breaking gel designed to break after a time delay comprising a mixture of a water-base, borate-gum gel and a gel breaker selected from the group consisting of sulfur, calcium sulfate and mixtures thereof in the amount and granular size necessary to break the gel after said time delay, said gel breaker being coated with a binding agent selected from the class of water-soluble materials, said materials being suitable for use as a binding agent for said gel breaker.

3. A self-breaking gel designed to break after a time delay comprising a mixture of a water-base, borate-gum gel and a gel breaker selected from the group consisting of sulfur, calcium sulfate and mixtures thereof in the amount and granular size necessary to break the gel after said time delay, said gel breaker being coated with a binding agent selected from the class of water-insoluble temperature-sensitive materials, said materials melting at the temperature at which said gel breaker is to be used and being suitable for use as a binding agent for said gel breaker.

4. A method for fracturing through a well bore a subsurface earth formation comprising preparing a borate-gum, water-base gel, adding thereto a delayed action gel breaker selected from the group consisting of sulfur, calcium sulfate and mixtures thereof in the amount and granular size necessary to break the gel after a predetermined time delay thereby forming a mixture of gel and gel breaker, injecting said mixture of gel and gel breaker into said well bore and applying sufficient pressure to said mixture to open a fracture in said earth formation and forcing said mixture into said fracture.

5. The method of claim 4 wherein the gel breaker is coated with a binding agent selected from the class of water-insoluble, hydrocarbon-soluble materials, said materials being suitable for use as a binding material for said gel breaker.

6. The method of claim 4 wherein the gel breaker is coated with a binding agent selected from the class of water-soluble materials, said material being suitable for use as a binding material for said gel breker.

7. The method of claim 4 wherein the gel breaker is coated with a binding agent selected from the class of water-insoluble, temperature-sensitive materials, said materials melting at the temperature of the subsurface earth formation and being suitable for use as a binding material for said gel breaker.

8. The method of claim 4 wherein the gel breaker in the mixture is present in an amount and granular size sufficient to break the gel in between 1 and 24 hours.

9. A method for fracturing through a well bore a subsurface earth formation that contains fluids which are to be produced comprising preparing a borate-gum, water-base gel, adding thereto a delayed action gel breaker selected from the group consisting of sulfur, calcium sulfate and mixtures thereof in the amount and granular size necessary to break the gel after a predetermined time delay thereby forming a mixture of gel and gel breaker, injecting said mixture of gel and gel breaker into said well bore and applying sufficient pressure to said mixture to open a fracture in said earth formation forcing said mixture into said fracture, allowing said well to remain quiescent until said gel breaks, and producing said formation.

10. The method of claim 9 wherein the gel breaker is coated with a binding agent selected from the class of water-insoluble, hydrocarbon-soluble materials, said materials being suitable for use as a binding material for said gel breaker.

11. The method of claim 9 wherein the gel breaker is coated with a binding agent selected from the class of water-soluble materials, said material being suitable for use as a binding material for said gel breaker.

12. The method of claim 9 wherein the gel breaker is coated with a binding agent selected from the class of water-insoluble, temperature-sensitive materials, said materials melting at the temperature of the subsurface earth formation and being suitable for use as a binding material for said gel breaker.

13. The method of claim 9 wherein the gel breaker in the mixture is present in an amount and granular size sufficient to break the gel in between 1 and 24 hours.

References Cited in the file of this patent

UNITED STATES PATENTS

| | | |
|---|---|---|
| 2,681,704 | Menaul | June 22, 1954 |
| 2,879,847 | Irwin | Mar. 31, 1959 |
| 2,950,247 | McGuire et al. | Aug. 23, 1960 |
| 3,024,191 | Jones | Mar. 6, 1962 |
| 3,058,909 | Kern | Oct. 16, 1962 |
| 3,079,332 | Wyant | Feb. 26, 1963 |